United States Patent
Kurokawa et al.

[11] Patent Number: 6,139,986
[45] Date of Patent: *Oct. 31, 2000

[54] LITHIUM SECONDARY BATTERY

[75] Inventors: Teruhisa Kurokawa, Ama; Hiroshi Nemoto, Nagoya, both of Japan

[73] Assignee: NGK Insulators, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 09/097,823

[22] Filed: Jun. 16, 1998

[51] Int. Cl.[7] .................................................. H01M 2/00
[52] U.S. Cl. ........................... 429/61; 429/62; 429/161; 429/183; 429/211
[58] Field of Search .................... 429/161, 211, 429/94, 61, 62, 176, 181, 183

[56] References Cited

U.S. PATENT DOCUMENTS

| | | | |
|---|---|---|---|
| 4,327,157 | 4/1982 | Himy et al. | 429/61 |
| 4,341,847 | 7/1982 | Sammells | 429/27 |
| 5,188,909 | 2/1993 | Pedicini | 429/7 |
| 5,443,925 | 8/1995 | Machida et al. | 429/94 |
| 5,462,820 | 10/1995 | Tanaka | 429/174 |
| 5,518,837 | 5/1996 | Pulley et al. | 429/180 |
| 5,691,073 | 11/1997 | Vu et al. | 429/7 |
| 5,736,270 | 4/1998 | Suzuki et al. | 429/94 |

FOREIGN PATENT DOCUMENTS

| | | |
|---|---|---|
| 0 718 901 A1 | 6/1996 | European Pat. Off. . |
| 2 752 092 A1 | 2/1998 | France . |
| 406267528A | 9/1994 | Japan . |
| WO 96/30955 | 10/1996 | WIPO . |

OTHER PUBLICATIONS

Database WPI; Section Ch, Week 9443; Derwent Publications Ltd.; London, GB; Class L03, AN 94–344659 XP002086675 & JP 06 267528 A (Japan Storage Battery CO Ltd); Sep. 22,1994 *abstract*.

Patent Abstracts of Japan; vol. 017, No. 097 (E–1326); Feb. 25, 1993 & JP 04 289676 A (NGK Insulators LTD); Oct. 14, 1992 *abstract*.

Japanese Abstract for JP406267528A, Japan Storage Battery, Sep. 22, 1994.

*Primary Examiner*—Kathryn Gorgos
*Assistant Examiner*—Wesley A. Nicolas

[57] ABSTRACT

A lithium secondary battery includes an electricity generating portion in which positive electrode 60 and negative electrode 61 form a laminate through separator films 62 made of porous polymer so that the positive electrode 60 and the negative electrode 61 do not come in direct contact with each other, leads 65, 77 which are respectively connected to plural portions of the positive electrode 60 and the negative electrode 61 to make electricity collection, and a low melting point alloy member 76 as a current break mechanism being inserted in a current path of the inside of the battery, which is melted to break the current path when the temperature of the battery is raised over a predetermined temperature.

12 Claims, 2 Drawing Sheets

LITHIUM SECONDARY BATTERY

BACKGROUND OF THE INVENTION AND RELATED ART STATEMENT

The present invention relates to a lithium secondary battery that can be easily manufactured, which has small internal resistance, and is provided with a safety mechanism for breaking a current at an abnormal time such as temperature rise in the battery due to over-charging/discharging.

A lithium secondary battery has attracted a great deal of attention as a secondary battery that is small, which has a large energy density, and can be charged and discharged, and which can be used as a power source for an electric equipment such as a portable communication equipment and a notebook-sized personal computer, the electric equipment being rapidly downsized in recent years. Moreover, concerns for resource saving and energy saving are raised on the background of internationally protecting the earth environment, and this is one of the reasons why the lithium secondary battery is expected as a motor driving battery for an electric vehicle. Further, considerable concerns are given to putting a large capacity lithium secondary battery into early practical use for the purpose of using it as an emergency backup power source for a large communication equipment or a host computer which supports an information society.

Especially, as to automobiles, the movement of switching into alternative energy that can reduce a large amount of consumption of fossil fuels such as gasoline has rapidly spread for these several years. For example, introduction of electric vehicles is regulated by law in many countries and many regions. As a battery for such an electric vehicle, conventionally, a lead acid storage battery has been mainly used. However, since the lead acid storage battery itself is heavy and requires a large capacity, it has been difficult to realize driving performance comparable to a gasoline fueled vehicle. However, it has been achieved to provide lithium secondary battery having a high performance in recent years, and the realization of electric vehicles has taken shape.

Although the structure of such a large lithium secondary battery has not been reported openly, it is possible to basically make its structure similar to a small lithium secondary battery. That is, in a small lithium secondary battery, as shown in FIG. 3, in an electricity generating portion, positive electrodes 50 and negative electrodes 51 including negative lead portions 52 are wound through separators 53, and the wound member is inserted into a metal battery case 1 so as not to cause the positive electrodes 50 to be electrically connected through the battery case 1 by an insulating film 54. The negative lead portions 52 are connected to the inside of the metal battery case 1. A positive lead 3 is attached to the positive electrodes 50, and an insulating plate 55 is provided so that the positive lead 3 is not brought into contact with the negative electrodes 51. A non-aqueous electrolytic solution in which an electrolyte is dissolved, is filled in an electrode wound portion.

The lithium secondary battery is a secondary battery that can be charged and discharged, which has properties that the potential is higher than conventional secondary batteries, and the energy density is high. Thus, the lithium secondary battery is provided with a safety mechanism for preventing accidents such as a burst of the battery caused from rising of the battery temperature by abnormalities at the time of charging and discharging, for example, over-discharging due to a short circuit of external terminals, abnormalities in rapid charging or over-charging due to malfunction of a charging device, application of a reverse connection potential by erroneous use of a user, and the like. That is, as shown in FIG. 2, one end of the positive lead 3 connected to the positive electrodes 50 is connected to an internal terminal 4 having a pressure releasing hole 5, and the other end of the positive lead 3 is connected to the positive electrode. The internal terminal 4 is electrically connected to a pressure switch plate 7 having a burst groove 9 through a contact B, and further, the pressure switch plate 7 is connected to an external terminal 15 through a PTC positive temperature coefficient element 21. The internal terminal 4 and the pressure switch plate 7 are isolated from each other by an insulator 6 so that when the contact B separates by the increase of an inner pressure of the battery, the electrical connection is lost. All these parts are contained in the battery case 1.

In case that the temperature of the battery itself having such a safety mechanism is raised by the occurrence of abnormal state upon use of the battery, when the PTC element 21 reaches a predetermined temperature, the resistance thereof abruptly increases so that a current hardly flows. Thus, a battery reaction is suppressed and the rising of the battery temperature is suppressed. In this case, as this kind of PTC element, a mixture of conductive particles and polymer is generally used. In other words, such a mixture has low resistance at room temperature since the conductive particles form a conductive path, while at a temperature higher than a predetermined temperature, the mixture comes to have high resistance close to an insulator since the molecular structure of the polymer is changed so that the conductive path formed of the conductive particles is cut to pieces, and when the temperature decreases again, the polymer returns to the original structure so that the conductive path of the conductive particles is formed and the resistance thereof is returned to a low value.

However, if the internal pressure of the battery is raised notwithstanding that a current is restricted by the PTC element 21, and the internal pressure exceeds the welding strength of the contact B between the pressure switch plate 7 and the internal terminal 4, the contact B separates so that the connection between the electricity generating portion and the external terminal is completely interrupted and the battery reaction does not occur. Further, nevertheless, if the internal pressure is raised, the burst groove 9 bursts so that the internal pressure is released to the atmospheric pressure. Such a mechanism is conventionally adopted.

In addition to the above described current control mechanism, a safety mechanism is provided such that by using a microporous film, such as polyethylene having a low softening point, as the separator for separating the positive electrode from the negative electrode in the electricity generating portion; when the battery temperature is raised, the separator film is softened and micropores formed in the film are collapsed, so that the movement of lithium ions is blocked and the battery reaction is suppressed.

However, for a large battery the resistivity of the abovementioned PTC element made of the conductive particles and polymer is too large, about $1\Omega \cdot$ cm at room temperature. So the PTC element may cause the large output loss and the short lifetime. Especially, in the case where such a PTC element is mounted on a large battery, concentration of current inside the PTC element is apt to occur due to the increase of an area of the element, which causes heat generation, so that the mounting to a large battery is difficult. In addition, the PTC is generally expensive, and a large-sized one is not manufactured. Accordingly, a current control element which is more inexpensive, is capable of dealing with a large battery, and has low resistance, is earnestly desired.

Further, it is thought that if a large battery is erroneously treated, the scale of accidents would become larger and the danger derived therefrom would also become higher than that imagined from a small battery. So it is considered to be desirable to make the safety standard for a large battery stricter than that of a small battery. At present, in a PTC used for a small lithium secondary battery, the transition temperature at which the resistance of the PTC abruptly increases is about 130° C. For a large lithium secondary battery, this transition temperature about 130° C. is too high. So a material or a mechanism to break current at a temperature lower than this temperature is required.

In addition to such problems of the prior art, it is considered to be necessary to contrive means such that the resistance of an electricity generating portion itself is made small to widen the selection of materials of positive electrodes and negative electrodes. Also, efficient electricity collection from the electricity generating portion to the outside terminal is effective in improving the performance of the battery. Moreover, in order to put a battery into wide use, it is also necessary to lower the manufacturing cost, and it is preferable that a battery having a simple structure is manufactured by a simple method.

SUMMARY OF THE INVENTION

The present invention has been made in view of the above-described problems to be solved, and an object of the present invention is therefore to provide a lithium secondary battery having an electricity generating portion in which negative electrode and positive electrode form a laminate through separator films made of porous polymer in such a manner that the negative electrode and the positive electrode do not come in direct contact with each other, the lithium secondary battery being characterized in that leads are connected to plural portions of the positive electrode to make electricity collection from the positive electrode, and leads are connected to plural portions of the negative electrode to make electricity collection from the negative electrode.

As the separator film formned of porous polymer used for the lithium secondary battery of the present invention, it is preferable to use a three-layer structure in which a polyethylene film having micropores is sandwiched between polyproplene films having micropores.

In addition, in the lithium secondary battery of the present invention, one of an external terminal electrically connected to the positive electrode and an external terminal electrically connected to the negative electrode is electrically connected to the corresponding electrode of the electricity generating portion through a metal battery case as a part of a current path, and the other external terminal is attached to a part of an insulating plate and is insulated from the battery case while being electrically connected to the corresponding electrode of the electricity generating portion to form a current path. It is preferable to mount a current break mechanism such that a low melting point alloy member having a melting point of from 50° C. to 130° C. is inserted in the current path for connecting the external terminal provided on the insulating plate to the electricity generating portion, and when the low melting point alloy member is heated up to the melting point, the low melting point alloy member is melted to break the current path.

Here, a phenolic resin plate, that is, a BAKELITE (a product of Union Carbide Corporation) plate is preferably used as the insulating plate, and an aluminum metal case is inexpensive and good in workability so that it is preferable as the battery case. Further, it is preferable that the external terminal provided on the insulating plate is a member which can be attached to and detached from the insulating plate in a screwing manner, and the low melting point alloy member is integrated with the external terminal provided on the insulating plate by a mechanical method such as caulking, since it is possible to easily make exchange for a desirable low melting point member according to the environment of use.

Further, in the lithium secondary battery of the present invention, it is preferable to make a structure such that a plurality of leads respectively connected to each of the positive and negative electrode are bundled and fixed to a rivet made of the same material as the leads, the rivet is welded to an internal terminal provided in the inside of the battery and made of the same material as the rivet, and the internal terminal and the battery case are insulated from each other by a heat shrinkage tube. Elastomer resin such as ethylene-propylene rubber is preferably used as the material of the heat shrinkage tube. Since it is sufficient that the leads are fixed to the rivet, it is needless to say that a screw may be used instead of the rivet.

As described above, according to the lithium secondary battery of the present invention, since the electricity collection is carried out by the plurality of leads from the electrodes of the electricity generating portion, the resistance of the positive electrode and the negative electrode can be lowered. Further, the lithium secondary battery includes the current break mechanism by the low melting point alloy member, so that the internal resistance of the battery is made small, the charging and discharging characteristics of the battery are superior, and the safety is excellent.

DETAILED DESCRIPTION OF PREFERRED EMBODIMENT

Preferred embodiments of the present invention will next be described with reference to the drawings. However, it should be noted that the present invention is not limited to the embodiments described below.

Figure 1:
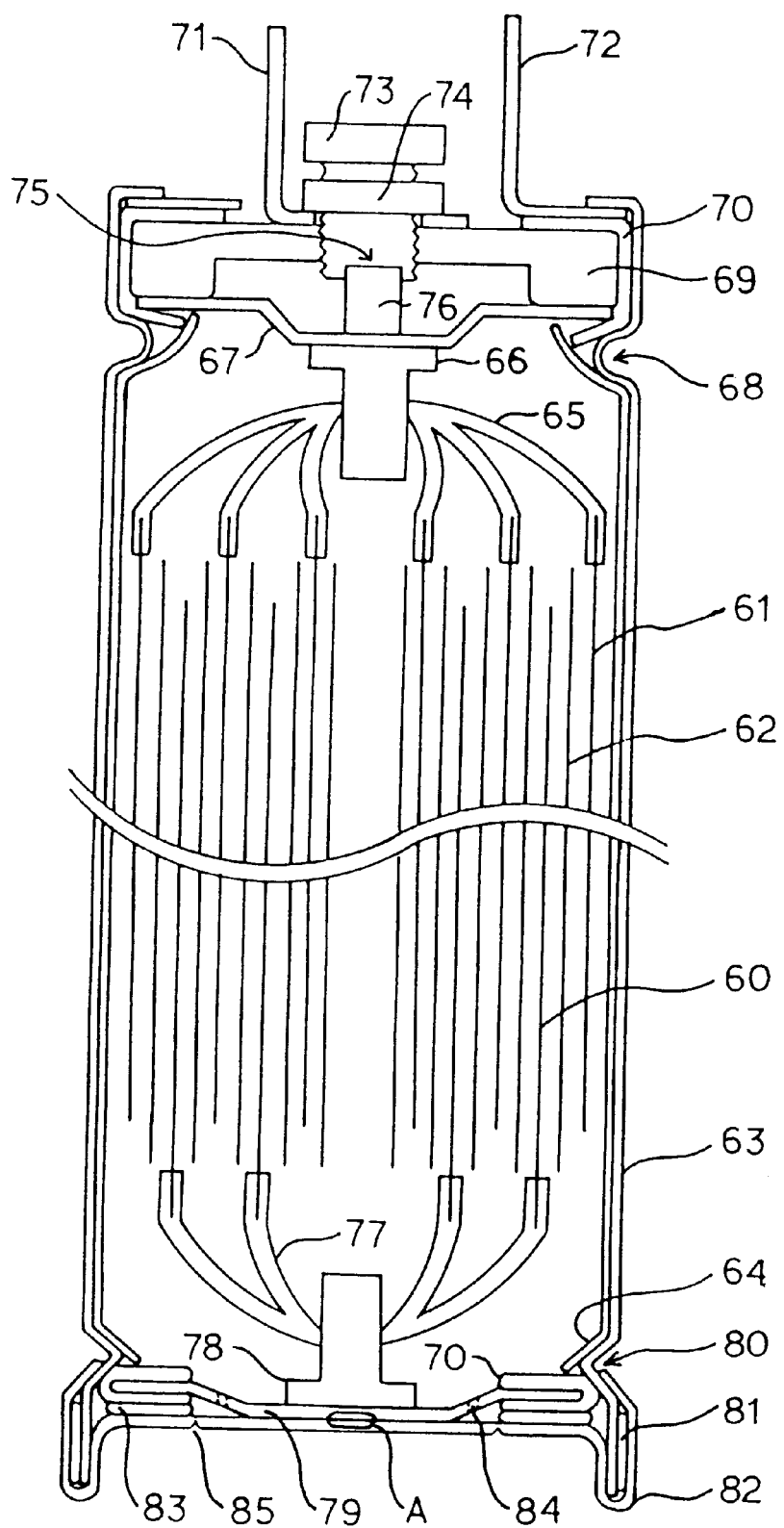
FIG. 1 is a sectional view showing the structure of a lithium secondary battery of the present invention.
Figure 2:
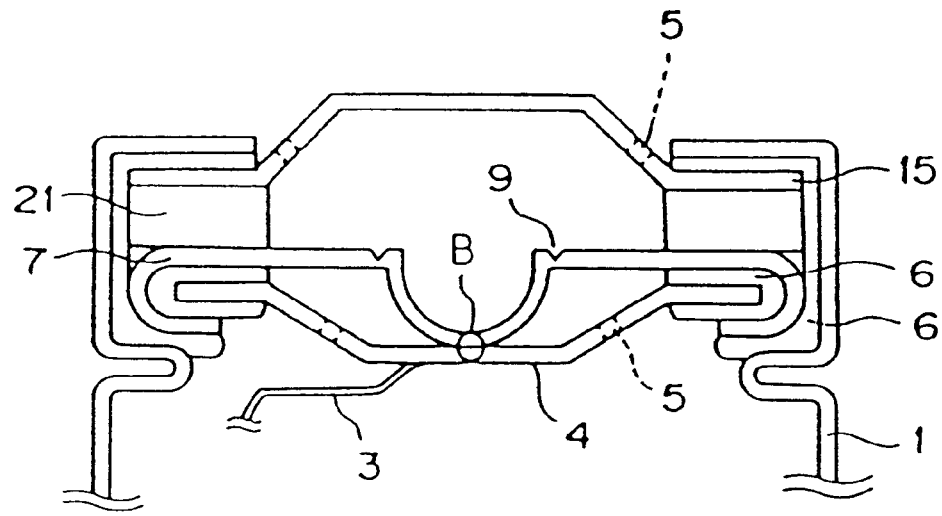
FIG. 2 is a sectional view showing the safety mechanism of a conventional small lithium secondary battery.
Figure 3:
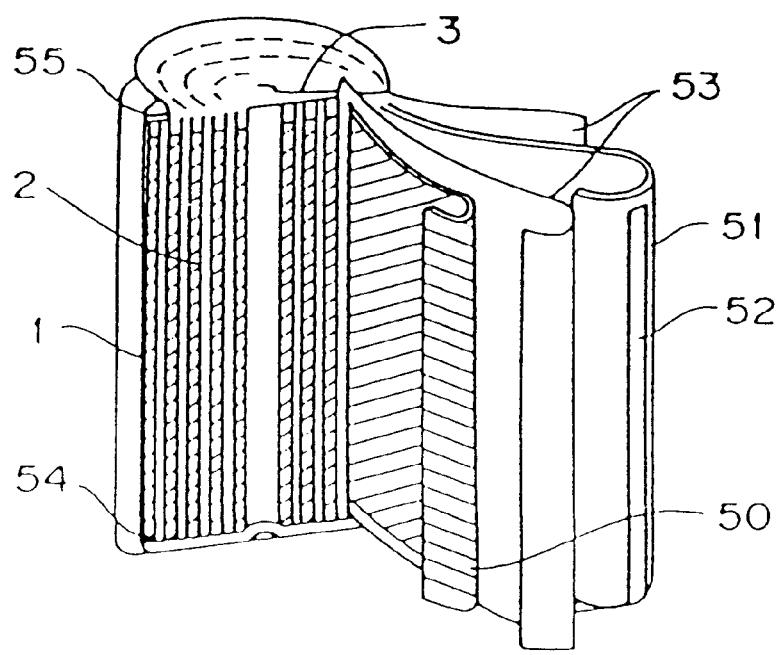
FIG. 3 is a perspective view showing the structure of an electricity generating portion of a conventional small size lithium secondary battery.

FIG. 1 is a sectional view showing an embodiment of a lithium secondary battery of the present invention. Positive electrode 60 and negative electrode 61 are insulated from each other through separator films 62, and these are wound to form an electricity generating portion. At this time, the positive electrode 60 and the negative electrode 61 are wound while the stacked position is shifted, so that they are easily connected to leads for collecting electricity. The thus produced electrode portion is inserted in a tube of aluminum as a battery case 63, and at this time, the inner surface of the battery case 63 is coated with a polyproplene film 64 to avoid direct contact with the electrode plates.

Here, as the positive electrode 60, an aluminum foil coated with lithium-cobalt oxide ($LiCoO_2$) as a positive active material and carbon powder as a conductive agent is used. However, since cobalt is generally expensive, it is also possible to use inexpensive lithium-manganese oxide (LiMn$_2$O$_4$) or the like as the positive active material, though it is inferior in battery characteristics such as lithium capacity to LiCoO$_2$. It is determined by the purpose, use condition, cost and the like of the battery which positive active material should be used. The carbon powder is added to give conductivity to the positive active material, and acetylene black, graphite powder, or the like may be used.

Further, it is preferable to use a high purity material for aluminum members used in the present invention, such as the aluminum foil constituting the positive electrode 60 and aluminum tube as the battery case 63, in order to prevent the battery performance from lowering due to corrosion by an electrochemical reaction of the battery.

On the other hand, as the negative electrode 61, it is preferable to use a copper foil coated with an amorphous carbon material such as soft carbon or hard graphite, or carbon powder such as natural graphite or synthesized graphite, as a negative active material. Here, similarly to the aluminum members used for the positive electrode, it is preferable to use a high purity material for the copper foil used for the negative electrode 61, and other copper members used for the lithium secondary battery of the present invention, in order to withstand the corrosion due to an electrochemical reaction. Although it is needless to say that the above-mentioned carbon material used for the negative electrode has properties to adsorb and desorb lithium ions, it is known that a part of the lithium ions adsorbed to the carbon material at the initial charging reaction of the battery becomes the so-called dead lithium which is kept adsorbed to the carbon material and does not contribute to the subsequent charging and discharging reaction, so that the capacity of the battery is lowered. Thus, it is preferable to select a material in which the amount of the dead lithium is small.

Moreover, as a material of the separator film 62, it is preferable to use a three-layer structural material in which a polyethylene film having micropores which are permeable to non-aqueous solution dissolving electrolyte is sandwiched between porous polypropylene films having micropores which are permeable to non-aqueous solution dissolving electrolyte. This serves also as a safety mechanism in which when the temperature of the electricity generating portion is raised, the polyethylene film is softened at about 130° C. so that the micropores are collapsed to suppress the movement of lithium ions in electrolytic solution, that is, the battery reaction. When the polyethylene film is sandwiched between the polypropylene films having a higher softening temperature than the polyethylene film, it is possible to prevent the contact between the separator film 62 and the positive and negative electrodes 60, 61 even after melting of polyethylene film.

Next, the structure in the vicinity of a negative terminal will be described. The negative electrode 61 is connected to leads 65 at plural portions by resistance welding, ultrasonic welding, and the like. By carrying out the electricity collection from the plural portions in this way, as compared with a case where the electricity collection is carried out from only one portion, it becomes possible to lower the resistance of electricity collection in the winding direction of the wound negative electrode 61, and becomes possible to improve the output of the battery. Such a means becomes to play an important role in decreasing the resistance of electricity collection as the area of an electrode is made large in accordance with the increase of capacity of a battery. Incidentally, as materials of the leads 65, it is preferable to use copper which is superior in conductivity and corrosion resistance against an electrolytic solution, like the negative electrode.

The thus provided leads 65 are gathered to a copper rivet 66 and are electrically connected so that electricity collection is carried out. This rivet 66 is connected to a negative internal terminal plate 67 made of copper by welding, and a contrivance is made so that the negative internal terminal plate 67 does not slip down toward the direction of the electricity generating portion by a squeezed portion 68 provided on the battery case 63. An insulator plate 69 is stacked on the negative internal terminal plate 67 and the upper end of the battery case 63 is bent to be subjected to caulking, so that the negative internal terminal plate 67 and the insulator plate 69 are fixed to each other. At this time, in order to prevent the negative internal terminal plate 67 from coming in contact with the battery case 63, a heat shrinkage tube 70 is inserted between the negative internal terminal plate 67 and the battery case 63. Moreover, since the battery case 63 functions as a current path at the positive side, a positive output terminal 72 is inserted and fixed between the battery case 63 and the insulator plate 69 at the bent position of the upper end of the battery case 63. Incidentally, it is also possible to fix the leads 65 by replacing the copper rivet 66 with a screw.

Here, as the insulator plate 69, it is preferable to use hard resin of phenolic resin series, such as a BAKELITE (a product of Union Carbide Corporation) plate, which is superior in workability, insulating properties, and strength properties. When elastomer resin such as ethylenepropylene rubber is used as the heat shrinkage tube 70, such effects are obtained that adhesiveness becomes excellent, and more complete sealing is obtained. As to the positive output terminal 72, the same material as the electrode material, such as aluminum or copper, is a material which can be most easily handled, and the shape of the positive output terminal is preferably a flat plate ring such that the positive output terminal is uniformly brought into contact with a sealing portion of the battery case 63, and a terminal for connection to a load is protruded from a part of the ring.

A screw hole for insertion of a bolt 73 to mount the negative output terminal 71 is provided at the center of the insulator plate 69. Handling is easy if the negative output terminal 71 has a flat plate ring shape having a center hole through which the bolt 73 passes, and a terminal which is to be connected to a load and is protruded from a part of the outer periphery of the ring.

On the other hand, a recess portion 75 is provided at the tip of a screw portion of the bolt 73 for fixing the negative output terminal 71, and a low melting point alloy member 76 is fitted to the recess portion 75 and is integrated. In this way, the integration of the low melting point alloy member 76 and the bolt 73 for fixing the negative output terminal 71 is inserted through the center hole of the negative output terminal 71 into the screw hole provided in the insulator plate 69, so that the negative output terminal 71 is fixed. Further, the low melting point alloy member 76 is press contacted with the negative internal terminal plate 67, so that a current path from the negative electrode 61 to the negative output terminal 71 is formed. If a nut 74 is inserted into the screw portion of the bolt 73 so that the insertion depth of the bolt 73 can be determined, it becomes possible to adjust the position of the bolt 73 in accordance with the size or shape of the low melting-point alloy member 76.

A material having a melting point of 50° C. to 130° C. is preferably used for such low melting point alloy member 76, and various kinds of bismuth-based fusible alloy, such as 50Bi-27Pb-13Sn-10Cd, may be cited as an example. Such low melting point alloy member 76 functions as a safety mechanism to stop the battery reaction in such a manner that the alloy member is melted to break the current path when the temperature of the battery is raised by over-charging/discharging of the battery. In the battery structure of the present invention, as described before, since the low melting point alloy member 76 is integrated with the bolt 73 for fixing the negative output terminal 71, it is possible to easily make exchange for a new bolt 73 with a low melting point alloy member 76 having a desired melting point on the basis of a use of employment, employed environment, safety standard, and the like.

Further, it is also possible to make the low melting point alloy member 76 serve as a current fuse by variously changing the shape of the low melting point alloy member 76. In this case, when it is necessary to make the low melting point alloy member 76 shaped into a thin wire or a thin film, it is possible to use a member which is subjected to such a process that an insulating ceramic, a hard polymer having a high softening point, or the like is used as a core rod, and the low melting point alloy member 76 is caulked around the outer circumference of the core rod.

Next, the structure of the positive side will be described. The positive electrode 60 and leads 77 are connected to each other at plural portions by resistance welding, ultrasonic welding or the like. The reason why the electricity collection is carried out from the plural portions in this way is the same as in case of the negative electrode 61. As materials of the leads 77, aluminum identical to the material of the positive electrode 60 is preferably used. These leads 77 attached to the positive electrode 60 are connected at an aluminum rivet 78 and electricity collection is made. The aluminum rivet 78 is integrated with a positive internal terminal plate 79 made of aluminum by welding. The positive internal terminal plate 79 is positioned by a caulking portion 80 provided on the battery case 63 through an insulating heat shrinkage tube 70 so as to prevent the positive internal terminal plate from coming in direct contact with the inner surface of the battery case 63. A part of the positive internal terminal plate and an aluminum battery cap 82 as a bottom of the battery forms contact A by welding. Further, the battery cap 82 is mechanically press contacted by caulking to the side surface of the battery case 63 through a dissolving polypropylene 81 as a sealing material in such a manner that the battery cap is electrically connected to a part of the inner surface of the battery case 63. As a result, the inside of the battery is completely sealed and a current path from the positive electrode 60 to the positive output terminal 72 is formed. At this time, although a polypropylene ring 83 is inserted between the positive internal terminal plate 79 and the battery cap 82 to stabilize the positive internal terminal plate 79, it may be omitted according to the shape of the positive internal terminal plate 79.

Here, the welded contact A between the positive internal terminal plate 79 and the battery cap 82 constitutes the current path at the positive side and also functions as a pressure switch for breaking a current at the abnormal time of the battery. That is, a pressure releasing hole 84 is provided in the positive internal plate 79, and when the internal pressure is increased by decomposition of the electrolytic solution or the like due to rising of the battery temperature, the pressure in the internal of the battery is sensed by the battery cap 82, and the welded contact A between the positive internal terminal plate 79 and the battery cap 82 separates when the internal pressure of the battery exceeds the welding strength of the welded contact A, so that the current is completely broken. Thus, if the positive internal terminal plate 79 is brought into direct contact with the inner surface of the battery case 63, these contact portions become current paths, so that the effect of breaking the current by the pressure switch is not obtained. Thus, the aluminum internal terminal and the battery case 63 are separated from each other by the insulating heat shrinkage tube 70.

Further, a V-shaped groove 85 is formed in the battery cap 82 by a method of electric discharge machining or the like, the thickness of the battery cap 82 is thin at this portion, and the mechanical strength is weakened. Thus, when the internal pressure of the battery becomes higher than the mechanical strength of the V-shaped groove 85 because of abrupt increase of pressure in the inside of the battery or the like although the welded contact A separates to suppress the battery reaction, the V-shaped groove 85 bursts to release the internal pressure so that an accident such as a burst of the battery itself can be prevented from occurring.

Accordingly, the lithium secondary battery of the present invention is provided with four kinds of safety mechanisms, that is, the current breaking mechanism by the low melting point alloy member 76, the current breaking mechanism by the pressure switch (welded contact A), the battery inner pressure releasing mechanism by the V-shaped groove 85, and the battery reaction suppressing mechanism by the separator film 62. These safety mechanisms are sequentially or separately operated according to the state and degree of abnormality occurring in the battery, so that the safety is secured.

Although the battery of the present invention is manufactured as described above, the order of sealing of the battery case 63 at the positive and negative portions finally carried out at the assembling steps of the battery does not matter. That is, after one of the electrode portions is sealed, an electrolytic solution obtained by dissolving an electrolyte such as $LiBF_4$ or $LiPF_6$ in a non-proton organic solvent is filled, and the other electrode portion can be sealed. Moreover, since the battery case 63 constitutes the current path, it is preferable to apply an insulating process such as wrapping the outer surface of the battery case 63 with an insulating plastic film or containing the battery itself in an insulating container.

As described above, according to the lithium secondary battery of the present invention, since electricity collection is carried out from plural positions of the electrode plates of the electricity generating portion through a plurality of leads, the internal resistance of the battery is lowered, and since a high resistance PTC element is not used for a current path, the internal resistance is totally lowered, so that the battery superior in charging and discharging characteristics can be obtained. In addition, the lithium secondary battery includes the current break mechanism due to the low melting point alloy member operating at a temperature of 50° C. to 130°0 C., and the safety mechanism due to pressure sensing which is used for a conventional small lithium secondary battery is also provided, so that the detection of battery abnormality is quick as compared with a conventional battery, and superior safety is obtained. Further, by using the heat shrinkage tube for the sealing portion of the battery, the adhesiveness becomes superior and the sealing becomes more complete. In addition, expensive parts are not needed for the manufacture of the battery, the structure thereof is simple, and the manufacture is easy, so that such a remarkable effect can be obtained that an inexpensive battery can be provided.

What is claimed is:

1. A lithium secondary battery comprising:
   an electricity generating portion in which a negative electrode and a positive electrode form a laminate with separator films made of porous polymer, said separator films preventing said negative electrode and said positive electrode from directly contacting one another;

an external terminal electrically connected to said positive electrode;

an external terminal electrically connected to said negative electrode;

a metal battery case connected to one of said external terminals, said case being part of a current path;

an insulating plate for electrically insulating one of said external terminals from said battery case; and a current break mechanism replaceably mounted within said battery case and comprising a low melting point alloy member in said current path and for connecting the external terminal that is electrically insulated from the battery case with one of said positive and negative electrodes;

wherein said low melting point alloy member melts to break said current path when said member exceeds its melting point, said low melting point alloy member being inserted into a recess portion of a bolt for fixing a negative output plate and in press contact with a negative internal plate, thereby forming a current path between said negative internal plate and said negative output plate as an integrated member under normal operating conditions.

2. A lithium secondary battery according to claim 1, wherein said laminate is a wind.

3. A lithium secondary battery according to claim 2, wherein:

one of an external terminal electrically connected to said positive electrode and an external terminal electrically connected to said negative electrode is electrically connected to said corresponding electrode of said electricity generating portion through a metal battery case as a part of a current path, the other external terminal is attached to a part of an insulating plate and constitutes a current path in which the other external terminal is electrically connected to said corresponding electrode of said electricity generating portion while being insulated from said battery case, and a current break mechanism is mounted such that a low melting point alloy member having a melting point of from 50° C. to 130° C. is inserted in the current path for connecting said external terminal provided on said insulating plate to said electricity generating portion, and when said low melting point alloy member is heated up to the melting point, said low melting point alloy member is melted to break the current path.

4. A lithium secondary battery according to claim 3, wherein said battery case is made of aluminum metal.

5. A lithium secondary battery according to claim 1, wherein each of said separator films has a three-layer structure in which a polyethylene film having micropores is sandwiched between polypropylene films having micropores.

6. A lithium secondary battery according to claim 5, wherein said insulating plate is a phenol resin.

7. A lithium secondary battery according to claim 5, wherein said battery case is made of aluminum metal.

8. A lithium secondary battery according to claim 5, wherein said external terminal provided on said insulating plate is a member which can be attached to and detached from said insulating plate in a screwing manner, and said low melting point alloy member is integrated with said external terminal member by caulking.

9. A lithium secondary battery according to claim 1, wherein said battery case is made of aluminum metal.

10. A lithium secondary battery according to claim 1, wherein a plurality of said leads connected respectively, to said positive electrode and said negative electrode are bundled and fixed to a rivet made of the same material as said leads, said rivet is welded to an internal terminal which is disposed in the inside of said battery and is made of the same material as said rivet, and said internal terminal and the battery case are insulated from each other by a heat shrinkage tube.

11. A lithium secondary battery according to claim 10, wherein said heat shrinkage tube is made of ethylene-propylene rubber.

12. A lithium secondary battery according to claim 1 wherein said melting point is between 50° C. and 130° C.

* * * * *